S. P. BARBER.
WHEEL.
APPLICATION FILED SEPT. 23, 1920.
1,425,824. Patented Aug. 15, 1922.
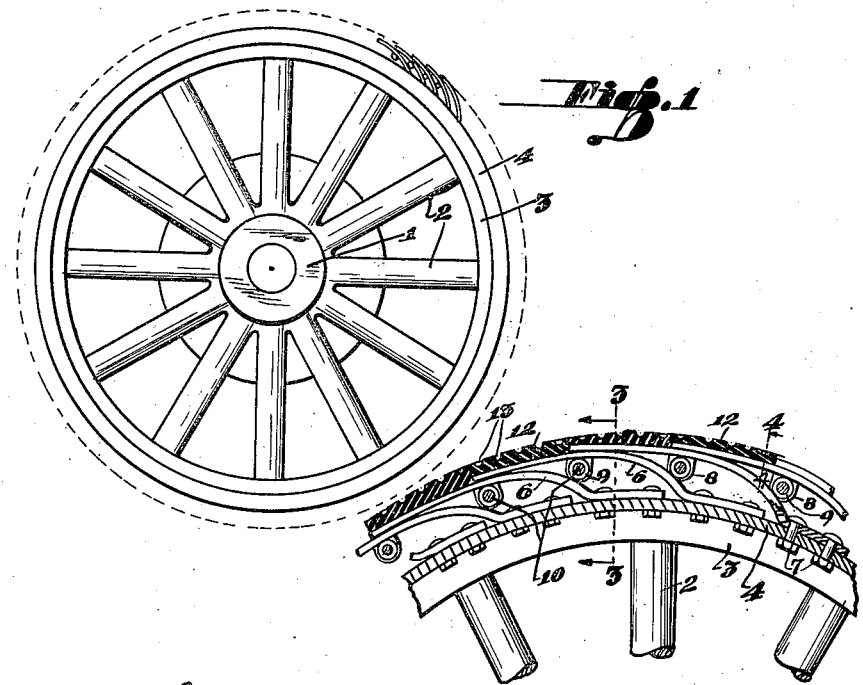
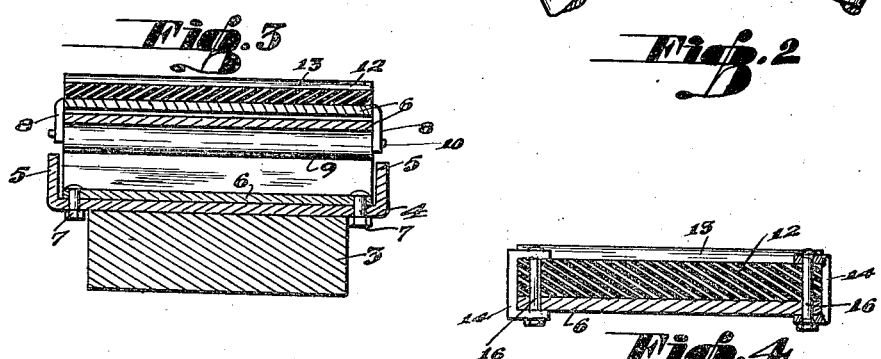
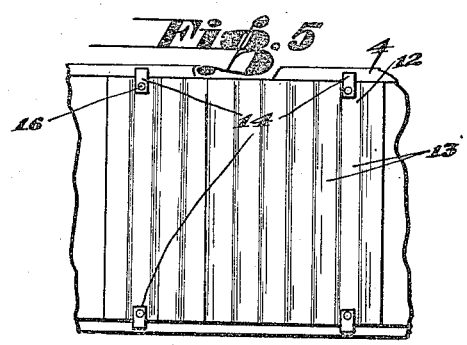
INVENTOR
S. P. Barber
by Hazard & Miller
Att'ys

UNITED STATES PATENT OFFICE.

SAUL P. BARBER, OF PASADENA, CALIFORNIA.

WHEEL.

1,425,824.  Specification of Letters Patent.  Patented Aug. 15, 1922.

Application filed September 23, 1920. Serial No. 412,119.

*To all whom it may concern:*

Be it known that I, SAUL P. BARBER, a citizen of the United States, residing at Pasadena, in the county of Los Angeles and State of California, have invented new and useful Improvements in Wheels, of which the following is a specification.

It is the object of this invention to provide a resilient wheel consisting of a usual wheel structure having a rim mounted upon the felly with a plurality of leaf springs extending from the rim and having their outer ends attached by suitable clip connections to the preceding spring upon the rim.

The invention will be readily understood from the following description of the accompanying drawings, in which Figure 1 is a side elevation of a wheel constructed in accordance with the invention.

Fig. 2 is a detail vertical section through a portion of the rim of the wheel.

Figs. 3 and 4 are transverse sections on the lines 3—3 and 4—4 of Fig. 2.

Fig. 5 is a detail fragmentary plan view of the traction surface of the wheel.

The wheel consists of a hub 1, spokes 2, and a felly 3, all of which elements may be of any well known or preferred construction.

A metallic rim 4 is mounted upon felly 3 and projects laterally beyond the felly with its edges outturned as shown at 5 in order to form a channeled construction.

The channel in the metallic rim 4 carries a plurality of leaf springs 6, the latter being fixed within the channel at one end and all extending outwardly therefrom and in the same general direction around the wheel. It will be observed that these springs are of a width substantially equal to the breadth of the channel, and are held within the latter by bolts 7. The base portions of these springs are positioned relatively close together and the free portion of each spring extends over and rests upon the next adjacent spring at a point a substantial distance inwardly from the free end of the said spring. In addition, the free end of each spring overlies a portion of the spring second removed therefrom, as shown particularly in Figure 2. The free end of each of the springs 6 is provided upon its opposite side edges with inwardly extending clips or ears 8 extending beyond the sides of the next adjacent spring so that the latter will be confined between the said ears. A roller bearing 9 is rotatably carried by these ears, and is in engagement at its outer side with the inner surface of one of the springs and rests at a diametrically opposite point against the outer surface of a spring further removed. It will be observed that the point of contact of the roller 9 with the last mentioned of these springs is slightly beyond the point of connection of the spring 6 with its base or anchor portion. Bolts or pins 10 passing through the ears 8 constitute bearings for the rollers. From this construction it is apparent that shocks or pressures to which the outermost of the springs are subjected will be distributed to a number of the spring leaves. The initial shock is borne by the spring end and is transmitted to the next adjacent spring and from thence, by means of roller 9, to the next removed spring, and the movements of these springs, due to compression thereof incident to shock, will in like manner be distributed around the wheel throughout all of the spring leaves. The rollers 9 also serve to maintain the springs in proper and guided relationship and prevent the free ends of said springs from moving out too far and at an objectionable angle to the tread surface, while permitting considerable degree of movement in the several springs due to compression.

When the wheel is employed upon hard roads or city pavements rubber cushioning blocks are preferably mounted upon the traction surfaces of the respective springs. These rubber blocks are shown at 12 as of suitable size to completely cover the exposed traction forming portions of each of the springs, and the traction surfaces of said blocks are preferably transversely corrugated as shown at 13.

Each of the rubber blocks may be detachably held in position upon its spring by means of clips 14 received over the edges of the rubber blocks and springs with the respective ends of a clip positioned in one of the corrugations 13, and abutting against the inner surface of the spring. These retaining clips may be held in position by means of bolts 16 extending through the ends of the clips and through the springs and the rubber blocks.

Various changes may be made in the construction as thus set forth without departing from the spirit of the invention.

What is claimed is:

1. A wheel having leaf springs fixed at one of their ends to the periphery of said wheel and including circumferential longitudinal continuations of said springs partially overlapping the next preceding springs, cushioning blocks upon the exposed ends of said springs, and U-shaped retaining clips received over the edges of said blocks and springs and against the outer surfaces of said blocks and beneath the inner surfaces of said springs.

2. A wheel having leaf springs fixed at one of their ends to the periphery of said wheel and including circumferential longitudinal continuations of said springs partially overlapping the next preceding springs to form a tread surface, and a contact roller carried by the extremity of the tread portion of each spring and arranged to bear against opposed surfaces of the overlapping portions of two other springs, the springs and rollers being so arranged that each spring has contact at spaced points with the rollers of two adjacent springs.

3. A wheel having leaf springs fixed flat at one of their ends against the periphery of said wheel, each of said springs being offset and curved longitudinally and forming a circumferential continuation of the flat fixed end thereof, said continuation of the spring having its end disposed over a pair of next preceding springs, and a roller carried by the free end of each of said springs and disposed between and bearing against the springs of the next preceding pair.

4. A wheel having leaf springs fixed flat at one of their ends against the periphery of said wheel, each of said springs being offset and curved longitudinally and forming a circumferential continuation of the flat fixed end thereof, said continuation of the spring having its free end disposed over a pair of next preceding springs, the free end of each spring bearing upon the medial portion of the next preceding spring, and a roller carried by the free end of each spring, and disposed between and bearing upon the springs of the next preceding pair.

In testimony whereof I have signed my name to this specification.

S. P. BARBER.